(12) United States Patent
Savant et al.

(10) Patent No.: US 7,547,981 B2
(45) Date of Patent: Jun. 16, 2009

(54) MACHINE HAVING ELECTRICAL POWER SYSTEM AND METHOD

(75) Inventors: Satish Savant, Peoria, IL (US); Bradford A. Kough, Metamora, IL (US); David M. Fee, Groveland, IL (US); Jonathan M. Baumann, Peoria, IL (US); Matthew Dames, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 231 days.

(21) Appl. No.: 11/704,814

(22) Filed: Feb. 9, 2007

(65) Prior Publication Data

US 2008/0191492 A1    Aug. 14, 2008

(51) Int. Cl.
*H02P 9/04*    (2006.01)
(52) U.S. Cl. ................. 290/1 R; 290/1 A; 180/165; 310/308
(58) Field of Classification Search ............. 290/1 R, 290/1 A, 1 C, 45; 180/165; 310/308, 309
See application file for complete search history.

(56) References Cited

U.S. PATENT DOCUMENTS

| | | | |
|---|---|---|---|
| 4,512,452 A | 4/1985 | Babitzka et al. | |
| 5,347,186 A * | 9/1994 | Konotchick | 310/17 |
| 5,510,660 A * | 4/1996 | Flatau et al. | 310/26 |
| 5,773,904 A | 6/1998 | Schiebold et al. | |
| 6,163,121 A * | 12/2000 | Kumar et al. | 318/434 |
| 6,692,405 B2 | 2/2004 | Minowa et al. | |
| 6,841,970 B2 * | 1/2005 | Zabramny | 320/101 |
| 6,898,501 B2 * | 5/2005 | Schubert | 701/50 |
| 7,114,585 B2 | 10/2006 | Man et al. | |
| 7,161,254 B1 * | 1/2007 | Janky et al. | 290/1 R |
| 7,453,163 B2 * | 11/2008 | Roberts et al. | 290/1 R |
| 2002/0098941 A1 | 7/2002 | Minowa et al. | |
| 2003/0155202 A1 | 8/2003 | Taniguchi | |

OTHER PUBLICATIONS

Pending publication of U.S. Appl. No. 11/642,300, filed Dec. 20, 2006; Torsional Damping Assembly.

* cited by examiner

*Primary Examiner*—Nicholas Ponomarenko
(74) *Attorney, Agent, or Firm*—Liell + McNeil

(57) ABSTRACT

A machine and electrical power system includes a generator having a speed range that includes a resonance speed associated with resonance vibrations of the system. A drive coupling is disposed between the generator and an engine configured to rotate the generator and is further configured to transmit torque from the engine to the generator, the drive coupling being configured to allow relative slip between first and second elements when the generator is rotated at its resonance speed. A machine operation method includes rotating a generator with an engine, and generating resonance vibrations of at least one of the engine and the generator by rotating the generator at a resonance speed. The method further includes inhibiting transmitting resonance vibrations between the generator and the engine by allowing relative rotational slip within a drive coupling disposed between the engine and the generator.

19 Claims, 5 Drawing Sheets

MACHINE HAVING ELECTRICAL POWER SYSTEM AND METHOD

TECHNICAL FIELD

The present disclosure relates generally to machines having electrical power generation systems and associated operating strategies, and relates more particularly to an electrical power system and method wherein a drive coupling within the system is configured to inhibit transmission of resonance vibrations between an engine and generator.

BACKGROUND

The combination of a combustion engine such as an internal combustion engine and a generator to produce electrical power has been known for many years. Relatively more recently, however, engine-driven generators have been used in electrically powered mobile machines to provide electrical power for propulsion and operation of other machine systems. In such strategies, rather than requiring relatively rapid ramp-up and down of engine output to accommodate changes in power demand, relatively more stable, smooth operation and transition across an engine power output range may be achieved. In other words, by powering some or all of the machine systems with electrical power provided by an on-board engine and generator system, combustion characteristics and overall engine operation can be more predictable and changes less rapid. This allows wide and rapid swings in engine speed and load associated with changes in power demand on the system to be avoided. Where engine operation is more predictable, and changes in engine output more gradual, superior control over emissions and other factors such as fuel efficiency has been demonstrated as compared to traditional designs wherein an engine directly powered the machine propulsion system, hydraulics, etc.

While the aforementioned developments have provided improvements to certain machines, particularly in environments where jurisdictional regulations set forth relatively high standards for emissions and efficiency, a variety of new challenges have arisen. For instance, in certain machines, particularly heavy-duty machines such as construction machines, mining machines, etc., a relatively large generator output is often necessary to provide sufficient power for running the machine. Most generators utilize components whose size is directly correlated with available generator output. Hence, electrical power systems for such machines often employ a generator with a relatively large rotor and other components, necessarily increasing the generator's internal inertia. The high generator inertia can give rise to mounting and other hardware-related challenges due to vibrations and inertia reflection between the engine and generator.

In many machine systems where an engine directly drives a generator vibrations and inertia associated with system operation can be transmitted between the engine and the generator. This can be particularly problematic where the generator inertia is fairly close to that of the engine. In some instances, resonance vibrations in the system can result in significant torque spikes within the system, at minimum wasting energy and roughening operation, and in certain instances even damaging components. While some system designs are sufficiently robust to withstand torque spikes when accelerating or decelerating through a speed range where resonance vibrations tend to occur, these systems can have other drawbacks, such as higher weight and cost.

Challenges associated with operating high-inertia electrical power generation devices with an engine have been previously recognized. United States Patent Application Publication No. 2003/0155202 A1 to Taniguchi is directed to a system wherein an alternator is driven by an engine. The alternator and engine are coupled together via a driving belt through a one-way clutch that transmits engine torque to the alternator and intercepts torque transmission from the alternator to the engine by allowing oscillatory relative rotation. Other strategies, also noted by Taniguchi, rely upon the use of torsional springs or other means for introducing torsional compliance into such alternator-engine systems. None of these known strategies, however, are concerned with nor provide any suitable means for addressing the above mentioned resonance vibration problems.

The present disclosure is directed to one or more of the problems or shortcomings set forth above.

SUMMARY OF THE INVENTION

In one aspect, the present disclosure provides an electrical power system for a machine having a generator configured to generate electrical power for the machine. The generator has a speed range that includes a resonance speed associated with resonance vibrations of the system. The power system further includes an engine configured to rotate the generator and a drive coupling having a first element fixed to rotate with the engine and a second element fixed to rotate with the generator. The first and second elements are configured to rotationally couple together for transmitting torque from the engine to the generator, the drive coupling being further configured to allow relative slip between the first and second elements when the generator is rotated at the resonance speed.

In another aspect, the present disclosure provides a machine having a frame, an engine mounted to the frame, and a generator configured to generate electrical power for the machine and coupled with the engine. The generator has a speed range that includes a resonance speed associated with resonance vibrations of at least one of the engine and the generator. The machine further includes a drive coupling configured to transmit torque between the engine and the generator, the drive coupling being further configured to allow non-oscillatory relative rotation between the engine and the generator when the generator is rotated at the resonance speed.

In still another aspect, the present disclosure provides a method of operating a machine system that includes the step of rotating a generator of the machine system with an engine of the machine system, the generator having a speed range that includes a resonance speed associated with resonance vibrations of the machine system. The method further includes the step of generating resonance vibrations of the machine system by rotating the generator at the resonance speed, and inhibiting transmitting resonance vibrations from the generator to the engine, including allowing relative rotational slip within a drive coupling disposed between the engine and the generator when the generator is rotated at the resonance speed.

DETAILED DESCRIPTION

Figure 1:
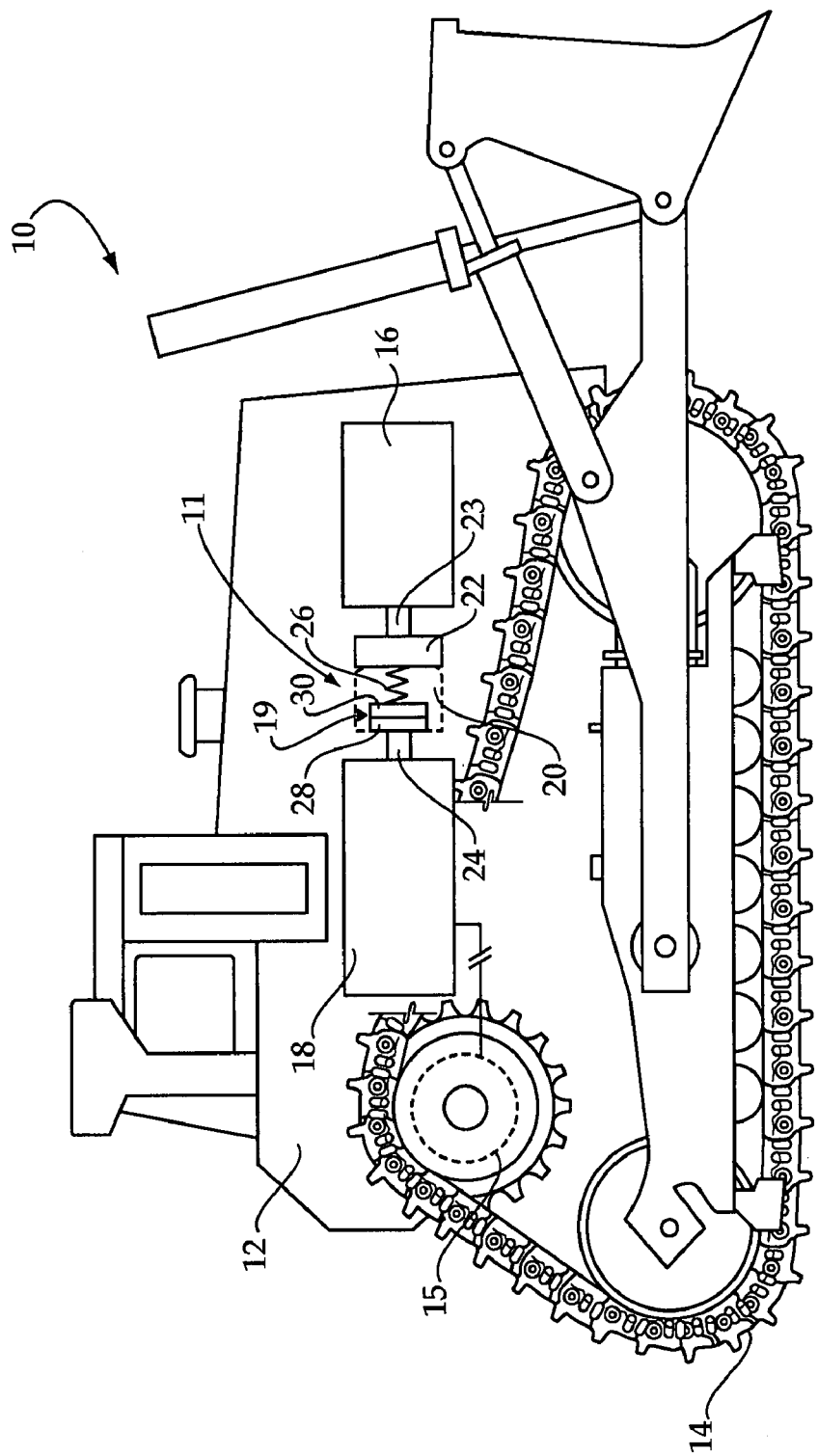
FIG. 1 is a side diagrammatic view of a machine having an electrical power system according to one embodiment.

Referring to FIG. 1, there is shown a machine 10 according to one embodiment. Machine 10 will typically include a mobile electric drive machine having a frame 12 with an electrical power system 11 mounted thereon. Electrical power system 11 may include an engine 16 configured to rotate a generator 18 which is configured to provide electrical power for machine 10. Machine 10 may further include a set of ground engaging elements such as tracks 14, only one of which is visible in FIG. 1, for propelling machine 10. Machine 10 will also typically include a drive coupling 20 configured for transmitting torque between engine 16 and generator 18 having a configuration and operation providing advantages over earlier strategies, particularly with regard to machine component strain and operating smoothness, as further described herein.

At least one electric motor 15 may be further provided which is coupled with generator 18 and configured to drive tracks 14. Motor 15, together with tracks 14, drive coupling 20 and power system 11 comprises a propulsion system for machine 10. While machine 10 is shown in the context of a track-type machine of the type commonly used in construction, mining, forestry, road building, etc., the present disclosure is not thereby limited. It should accordingly be recognized that a wide variety of machines, mobile and stationary, may fall within the scope of the present disclosure. It is contemplated, however, that certain electric drive machines having relatively large power requirements and using relatively large generators driven by similarly large engines will be particularly benefited by implementation of the teachings set forth herein.

As alluded to above, drive coupling 20 is configured to transmit torque between engine 16 and generator 18. To this end, drive coupling 20 may include or be coupled with an engine flywheel 22, in turn driven by an engine output shaft 23. Rotation of flywheel 22 will rotate a generator input shaft 24 via drive coupling 20, in turn rotating generator 18 and generating electrical power in a conventional manner. In the embodiment shown in FIG. 1, output shaft 23 and input shaft 24 are illustrated in a coaxial configuration, however, parallel axis gears, drive chains, belts, etc. might be used in embodiments where output shaft 23 and input shaft 24 are non-coaxially arranged. Moreover, for reasons that will be apparent from the following description, systems using conventional generators as opposed to other electrical power generating devices may be most apt to present problems advantageously addressed by the present disclosure. The term "generator," however, should not be so strictly limited as to exclude alternators and the like.

Generator 18 may include a speed range which includes a resonance speed associated with resonance vibrations of the generator/engine system. In one embodiment, rotating generator 18 at the resonance speed, for example at about 300-400 RPM, may result in torsional resonance vibrations transmitted to drive coupling 20, from at least one of engine 16 and generator 18. Drive coupling 20 provides a means for inhibiting transmitting resonance vibrations between input shaft 24 and output shaft 23 and, hence, inhibiting transmitting such resonance vibrations between other components of power system 11. Inhibiting transmitting resonance vibrations as described herein is contemplated in particular to avoid high torque spikes resulting from inertia reflection/interaction between engine 16 and generator 18. This will provide a smoother transition through certain portions of the speed range of generator 18 than would otherwise be possible. Moreover, resonance vibrations tend not only to waste energy and strain components, but in some instances can actually render it difficult or impossible to accelerate or decelerate through a speed range that includes a resonance speed. In one embodiment, the resonance speed may lie in a lower portion of the speed range of generator 18, for example a portion of the speed range passed through during start-up of machine 10 and prior to reaching a generator speed sufficient for producing enough electrical power for ordinary machine operation. In other words, generator 18 may have a speed range that includes both of a start-up range, corresponding to an engine speed less than low idle, and a working range corresponding to engine speeds above low idle.

Those skilled in the art will appreciate that the resonance speed of generator 18 will typically be associated with generator internal inertia, as well as with other mass-elastic characteristics of power system 11. Relatively larger generators capable of outputting sufficient electrical power to drive construction machines and the like will tend to have relatively higher internal inertias. Such generators will accordingly tend to be associated with first harmonic frequency vibrations of a power system of which the generator is a part when rotated at relatively slower speeds than smaller generators. While changes in component stiffness and other machine characteristics may be used to tune the mass-elastic system and thus affect the magnitude of the generator resonance speed, the present disclosure is considered to provide a straightforward means of addressing harmonic vibrations without resorting to redesigning the machine system. To the extent that resonance speed might be tailored at all in the present context, it may be advantageous for the resonance speed or speed range to be set relatively low to permit the attendant problems to be dealt with during start-up conditions rather than in situations where machine 10 is actually performing work.

Inhibiting transmitting resonance vibrations between generator 18 and engine 16 when generator 18 is operated at the resonance speed (or within a resonance speed range) may be achieved by allowing non-oscillatory relative rotation between output shaft 23 and input shaft 24 via drive coupling 20. To this end, drive coupling 20 may be configured to permit relative slip between components thereof rather than transmitting torque induced by resonance vibrations. In particular, drive coupling 20 may include a first element 30 fixed to rotate with engine 16 and a second element, which may consist of input shaft 24 coupled with a friction element 28, fixed to rotate with generator 18. When generator 18 is rotated at the resonance speed, friction element 28 may slip relative to element 30, for example responsive to torque induced by resonance vibrations. A biaser 26 may be provided, having a spring force for example, which is configured to bias element 30 into engagement with friction element 28. It should be appreciated that in other versions, friction element 28 may slip relative to other machine components in addition to friction element 28. Also, rather than a spring, a fluid actuator or some other device might be used to bias the respective elements into engagement. It should further be appreciated that FIG. 1 is a schematic illustration only and the particular arrangement of components, e.g. which element is biased against which other element, etc. may differ from that which is illustrated in FIG. 1. This will be further apparent from the following description.

The aforementioned components, element 30, biaser 26, and friction element 28 may be part of a passive clutch 19 having a clutch capacity defined at least in part by biaser 26. When a sufficient torque or a sufficient difference in torque is applied to drive coupling 20, a frictional force engaging friction element 28 with element 30 will be overcome and they will slip relative to one another to inhibit transmitting the torque through drive coupling 20. Engine 16 will have an output torque range, and biaser 26 may have a spring force defining a clutch capacity for clutch 19 that is higher than the output torque range of engine 16. This will allow drive coupling 20 to prevent relative rotational slip where engine 16 is operated within its output torque range, but inhibit transmitting torque larger than that for which engine 16, generator 18, or other components are rated. In other embodiments wherein an active clutch or the like is used, for example having a fluid actuator, relatively more precise control may be available, such that when resonance vibrations are detected or considered likely, for example, clutch pressure may be reduced to allow relative slip between the respective components. As used herein, "slip" refers to non-oscillatory relative rotation as opposed to such relative rotation as might be permitted by a spring coupling and the like. In an active clutch system according to the present disclosure, slip need not necessarily occur in response to resonance vibrations, but could instead be permitted at such time as generator 18 is determined to be entering a speed range where resonance vibrations are possible or likely.

Figure 2:
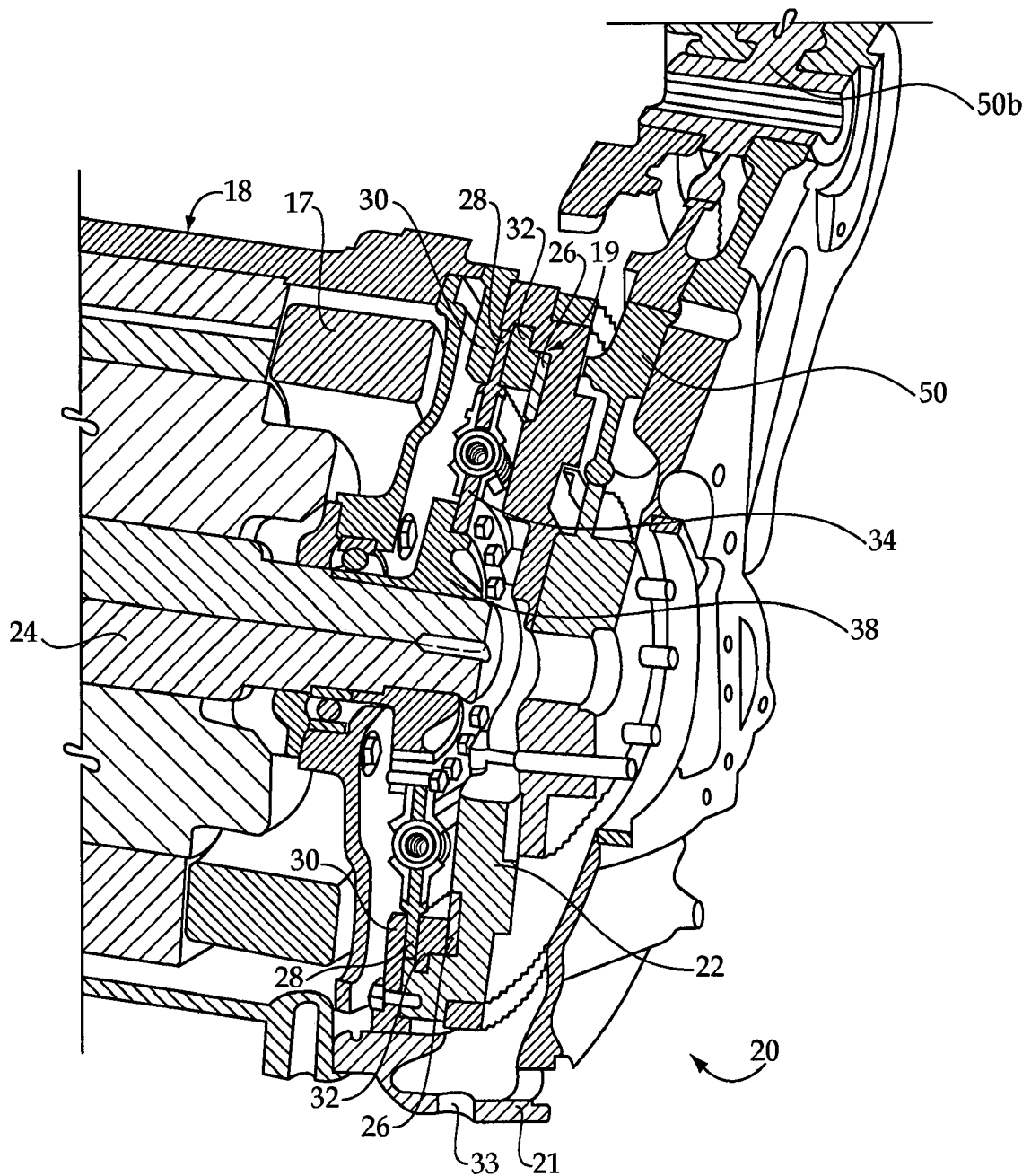
FIG. 2 is a sectioned side view, in multiple section planes, of a portion of a drive coupling according to one embodiment.
Figure 3:
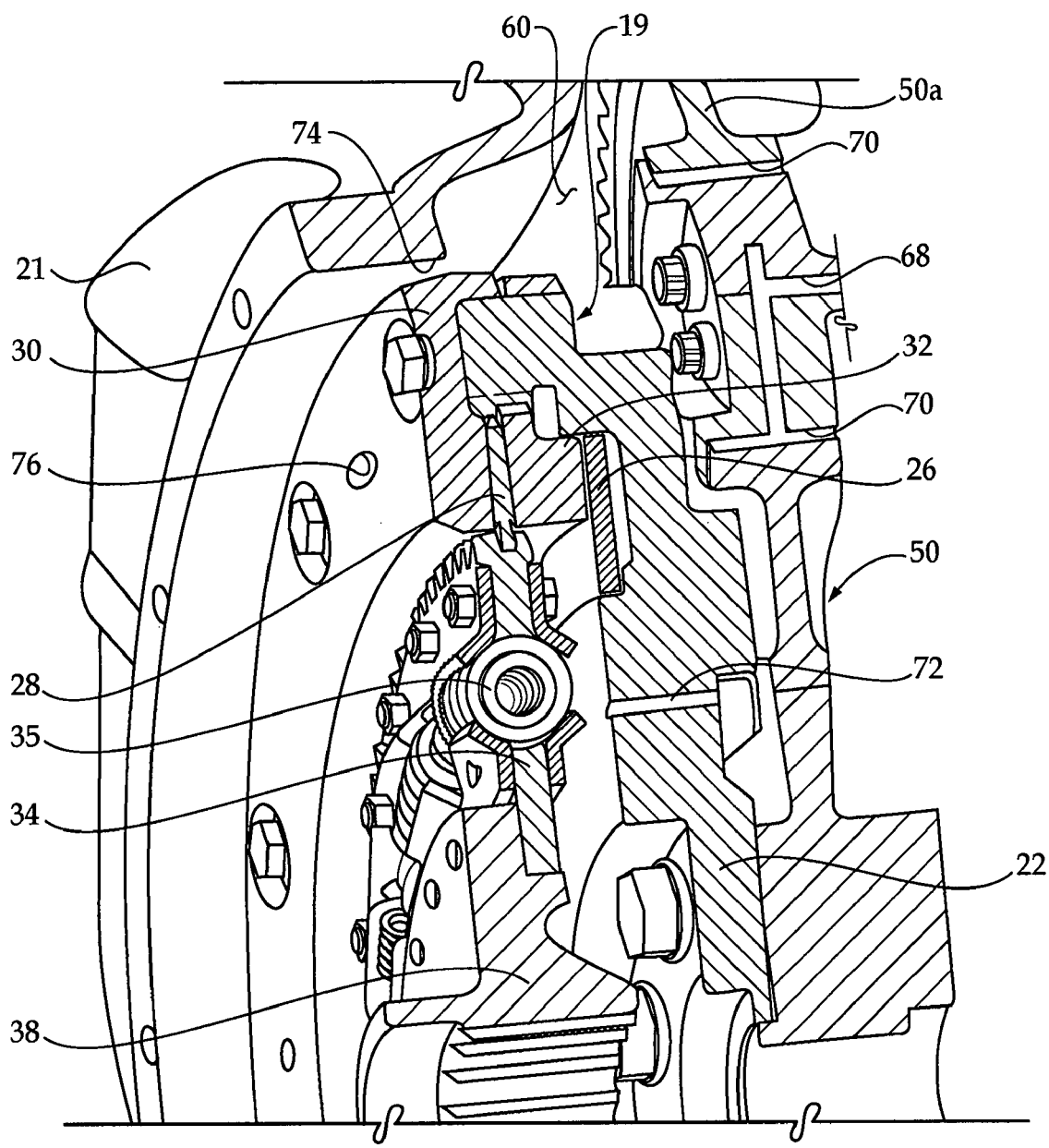
FIG. 3 is a different sectioned side view, also in multiple section planes, of a portion of a drive coupling similar to FIG. 2.

Turning now to FIGS. 2 and 3, there is illustrated one exemplary embodiment for drive coupling 20 showing certain of the internal components thereof, and also illustrating portions of generator 18 and a portion of its rotor 17. Drive coupling 20 may include a housing 21 having therein a geartrain 50 that includes a plurality of gears 50a and 50b. Housing 21 may be coupled with generator 18 and extend about flywheel 22 such that geartrain 50, flywheel 22 and various other components are housed within an enclosed environment. In particular, housing 21 may define an interior space 60 wherein the components are disposed which may consist of an oil mist environment. Machines such as machine 10 can operate in dusty or wet environments, and in some instances may submerge certain of their powertrain components in water. As such, an oil cooled system for clutch 19 and other components within housing 21 may provide a practical implementation strategy, although the present disclosure is not thereby limited and air cooling or some other cooling strategy might be used in other embodiments.

Referring in particular to FIG. 3, a geartrain oil supply passage 68 may be disposed in gear 50a, and may connect with a plurality of distribution passages 70 configured to fling oil into space 60 and onto various of the other components for cooling and lubrication thereof. A gap 74 may be defined by housing 21 and a reaction plate 30, described herein, for allowing oil or oil mist to be passed from one side of reaction plate 30 to another. Another set of oil distribution passages 72 may be positioned in flywheel 22 to permit oil or oil mist to pass through flywheel 22. Yet another set of oil passages 76 may be provided in reaction plate 30 itself. A scavenge point 33, shown in FIG. 2, may be provided for draining oil from housing 21 for subsequent cooling and redistribution.

Figure 4:
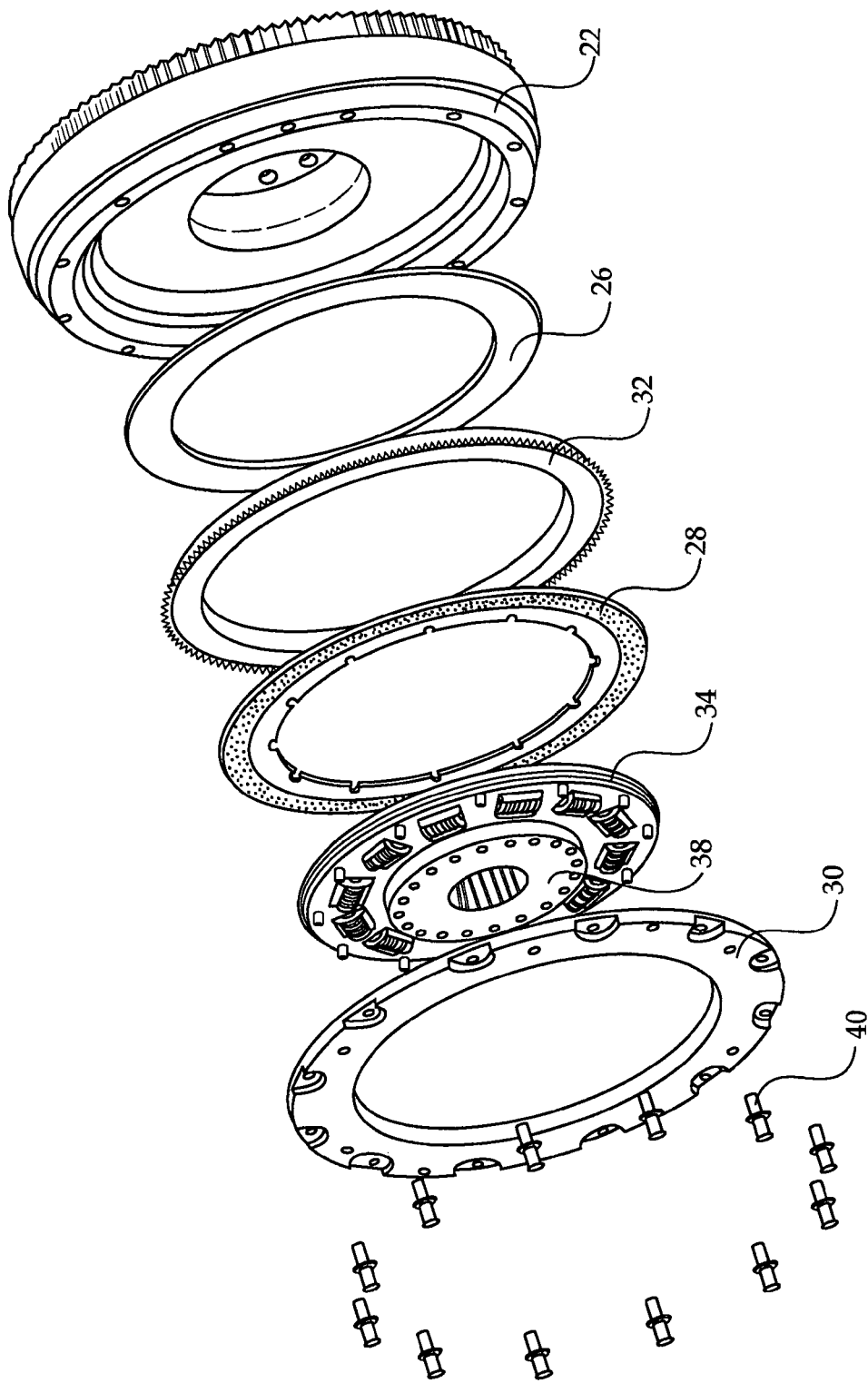
FIG. 4 is an exploded view of a portion of the drive coupling shown in FIGS. 2 and 3.

Referring also to FIG. 4, there is shown an exploded view of certain of the components of drive coupling 20. Reaction plate 30 may be coupled with flywheel 22 via a plurality of bolts 40. A spring or torsional coupling 34, attached to a hub adapter 38 and configured to mount on input shaft 24, friction disc 28, piston 32 and a biaser 26 may all be coupled together via bolting reaction plate 30 to flywheel 22. Piston 32 may have a splined engagement with flywheel 22, and hub adapter 38 may also have a splined engagement with input shaft 24 when all the respective components are assembled in machine 10. It should be appreciated that the illustrated design for spring coupling 34 is exemplary only and a wide variety of other configurations might instead be used. In still other embodiments, a spring coupling might be omitted form the design.

Biaser 26 may consist of a Belleville spring compressed to exert its spring force against piston 32 and thereby sandwich friction disc 28 between piston 32 and reaction plate 30. Other spring types may be used. Biaser 26 may have a spring force defining a capacity of clutch 19, the clutch capacity being based on an output torque of engine 16, also as described herein. Friction disc 28 may be mounted on spring coupling 34 by any suitable means such as via bolts or splines and fixed to rotate therewith. Spring coupling 34 may include a plurality of springs 35 and is configured to allow oscillatory torsional compliance between generator 18 and engine 16. In the presently described embodiment, piston 32 and reaction plate 30 will be fixed to rotate with flywheel 22, whereas hub adapter 38, spring coupling 34 and friction disc 28 are fixed to rotate with generator input shaft 24. When sufficient torque, caused by resonance vibrations of system 11 for example, is applied to hub adapter 38 by input shaft 24, friction disc 38 will slip, allowing non-oscillatory relative rotation ultimately between engine 16 and generator 18.

INDUSTRIAL APPLICABILITY

As discussed above, the first harmonic frequency of system 11 may be associated with a generator speed that is in a lower portion, for example a lower half, of a generator speed range, although the present disclosure is not thereby limited. Thus, in many embodiments, generator 18 will pass through the resonance speed during start-up and also during shutting down. It should further be appreciated that the present description of a resonance speed should not be understood to imply that only an exact generator RPM will be associated with resonance vibrations. Resonance vibrations may begin to build any time generator 18 is operated within a range of speeds. The particular timing of slip or other non-oscillatory relative rotation may depend upon torque resulting from torsional vibrations in the system rather than the actual generator speed. Hence, in some instances, the longer generator 18 is operated at a resonance speed, the greater the harmonic vibrations may become. Thus, whether and when drive coupling 20 will slip could depend not only on the particular generator speed but also upon how rapidly generator speed is increasing or decreasing. When a sufficient torque difference across drive coupling 20 is experienced, friction disc 28 will slip, inhibiting transmitting the torque through drive coupling 20. In embodiments wherein an active clutch is used rather than passive clutch 19, slip within drive coupling 20 may be permitted by reducing clutch pressure, for example.

Figure 5:
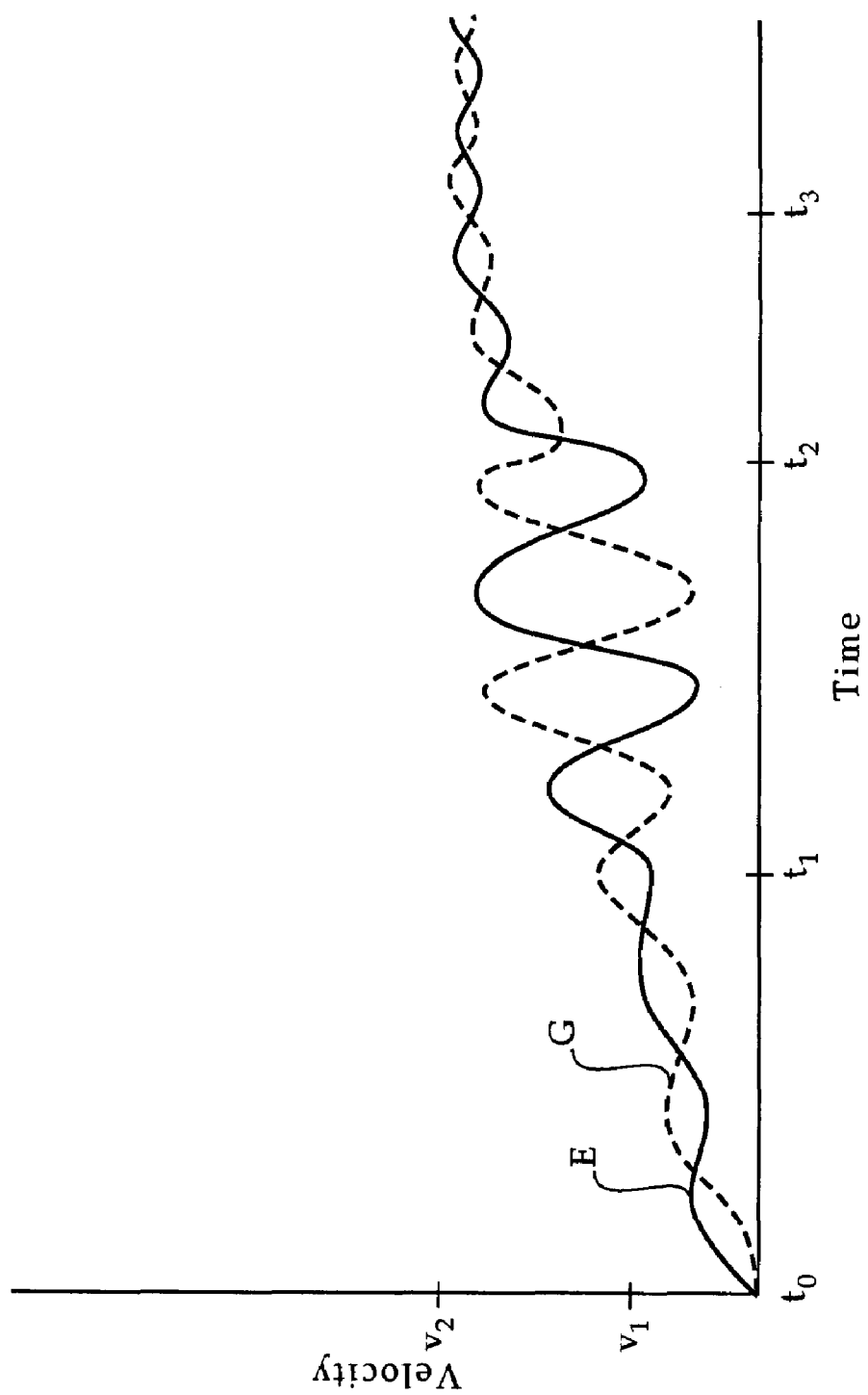
FIG. 5 is a graph illustrating engine speed relative to generator speed during machine/power system start-up according to one embodiment.

Turning to FIG. 5, there is shown a graph illustrating generator speed via line G and engine speed via line E during a typical start-up. At time $t_0$, engine 16 will begin to drive generator 18. Generator speed will typically increase apace with engine speed. Eventually, generator 18 will begin to enter a speed range that is associated with resonance vibrations of the system, for example at about time $t_1$. As described herein, resonance vibrations may induce torque in the system, adding to or opposing the torque being output by engine 16, or alternately doing both. Where a difference in torque on the components of drive coupling 20 which are configured to slip reaches a threshold which can overcome the capacity of clutch 19, slip will occur. Slip within the system will tend to inhibit transmitting resonance vibrations between generator 18 and engine 16 and will consequently inhibit transmitting potentially damaging, annoying, wasteful and otherwise undesired torque and counter-torque to engine 16.

It should be appreciated that the graph of FIG. 5 is illustrative only and the generator and engine speed fluctuations may be somewhat exaggerated. In some instance, speed traces may not actually exhibit a readily identifiable point in time where slip and/or re-engagement of drive coupling 20 occurs. Where instead of speed, torque is monitored, torque spikes associated with systems not having drive coupling 20 would tend to be especially acute during a time period where resonance vibrations are occurring. With the use of drive coupling 20, such torque spikes will typically be truncated to lower magnitudes at times corresponding to slip within drive coupling 20.

It will be appreciated that when slip is occurring, engine 16 continues to drive generator 18, and average generator speed G may continue to increase despite speed fluctuations that may occur from resonance vibrations. Eventually, at approximately time $t_2$, generator speed G will have increased beyond a range where resonance vibrations tend to occur, and will eventually increase towards a more or less steady state corresponding to a low idle speed for engine 16 at about time $t_3$.

In many known systems, generators are used which either do not tend to experience or induce resonance vibrations within their operating speed range, or if they do, do not undesirably interact with other system components. In other instances, stiffness, mass properties, and torsional couplings may be tuned in an attempt to raise or lower the speed at which harmonic vibrations occur to place it outside of a normal speed range for a particular system. A shortcoming of such an approach is that new mechanical dynamics problems may be created. The present disclosure provides a straightforward means of addressing problems attendant to resonance vibrations without having to re-design system components. In other words, it is unnecessary to tailor component stiffness, mass properties and the like around a need for avoiding resonance vibrations. The use of a drive coupling as described herein also enables spring coupling 34 to be used to tune the overall mass-elastic system apart from controlling generator resonance vibrations. Further, while the present disclosure is not strictly limited to an oil cooled strategy, it may be particularly applicable to oil cooled couplings as they tend to have relatively lower angular deflection limits than certain air cooled couplings, and are desirable in applications where the system may be at least partially submerged in water.

The present description is for illustrative purposes only and should not be construed to narrow the breadth of the present disclosure in any way. Thus, those skilled in the art will appreciate that various modifications might be made to the presently disclosed embodiments without departing from the full and fair scope of the present disclosure. For instance, while the present disclosure focuses primarily on the use of a passive clutch, other means such as active clutches wherein clutch pressure can be varied to permit slip are contemplated. Further, in certain systems, rather than providing for slip some other means of permitting non-oscillatory relative rotation might be employed, for example alternately engaging and disengaging a drive coupling. Other aspects, features and advantages will be apparent upon an examination of the attached drawings and appended claims.

What is claimed is:

1. An electrical power system for a machine comprising:
   a generator configured to generate electrical power for said machine, said generator having a speed range that includes a resonance speed associated with resonance vibrations of said system;
   an engine configured to rotate said generator; and
   a drive coupling having a first element fixed to rotate with said engine and a second element fixed to rotate with said generator, said first and second elements being configured to rotationally couple together for transmitting torque from said engine to said generator, said drive coupling being further configured to allow relative slip between said first and second elements when said generator is rotated at said resonance speed.

2. The system of claim 1 wherein said engine comprises a torque output range, and wherein said drive coupling comprises a clutch having a clutch capacity based at least in part on said torque output range.

3. The system of claim 2 wherein said clutch comprises a clutch capacity corresponding to a torque that is higher than said torque output range.

4. The system of claim 2 wherein the speed range of said generator includes a working range for said electrical power system and a second range lower than said working range, and wherein said resonance speed is within said second range.

5. The system of claim 4 wherein said resonance speed comprises a generator speed associated with a first harmonic frequency of said system.

6. The system of claim 4 wherein said clutch further comprises a friction disc configured to transfer torque between said first and second elements and a biaser biasing said friction disc against one of said first and second elements, said biaser defining at least in part said clutch capacity and being configured to allow said friction disc to slip relative to the one of said first and second elements responsive to resonance vibrations.

7. The system of claim 6 wherein said clutch comprises a passive clutch having a piston and a reaction plate, said reaction plate being rotatably coupled with one of said engine and said generator, wherein said biaser comprises a belleville spring having a spring force and being configured to sandwich said friction element between said piston and said reaction plate via said spring force.

8. The system of claim 7 further comprising a spring coupling configured to provide oscillatory torsional compliance between said generator and said engine.

9. A machine comprising:
   a frame;
   an engine mounted to said frame;
   a generator configured to generate electrical power for said machine and coupled with said engine, said generator having a speed range that includes a resonance speed associated with resonance vibrations of at least one of said engine and said generator; and
   a drive coupling configured to transmit torque between said engine and said generator, said drive coupling being further configured to allow non-oscillatory relative rotation between said engine and said generator when said generator is rotated at said resonance speed.

10. The machine of claim 9 comprising a propulsion system for said machine which includes said generator, said engine and said drive coupling, and electrically powered ground engaging elements coupled with said generator which are configured to propel said machine.

11. The machine of claim 10 wherein said engine includes an output shaft and said generator includes an input shaft coaxial with said output shaft, said drive coupling further comprises a clutch coupled with each of said input and output shafts and configured to slip to allow non-oscillatory relative rotation between said input and output shafts responsive to resonance vibrations of at least one of said engine and said generator.

12. The machine of claim 11 wherein said engine includes a torque output range, and wherein said clutch comprises a passive clutch having a spring with a spring force defining at least in part a capacity of said clutch, said spring force being based at least in part on said torque output range.

13. The machine of claim 12 wherein said clutch comprises an oil cooled clutch.

14. The machine of claim 12 comprising an electric drive track-type tractor having a first track and a second track comprising said ground engaging elements, wherein said drive coupling further comprises a spring coupling configured to allow oscillatory torsional compliance between said output shaft and said input shaft and a friction disc configured to transfer torque between said output shaft and said input shaft, said friction disc further being fixed to rotate with one of said input shaft and said output shaft and configured to slip relative to the other of said input shaft and said output shaft to allow said non-oscillatory relative rotation.

15. A method of operating a machine system comprising the steps of:
  rotating a generator of the machine system with an engine of the machine system, the generator having a speed range that includes a resonance speed associated with resonance vibrations of the machine system;
  generating resonance vibrations of the machine system by rotating the generator at the resonance speed; and
  inhibiting transmitting resonance vibrations between the generator and the engine, including allowing relative rotational slip within a drive coupling disposed between the engine and the generator when the generator is rotated at the resonance speed.

16. The method of claim 15 wherein the rotating step comprises rotating the generator via torque within an engine output torque range, the method further comprising a step of preventing relative rotational slip within the drive coupling when the generator is rotated via torque within the engine output torque range.

17. The method of claim 16 wherein the step of preventing relative rotational slip comprises preventing relative rotational slip within the drive coupling via a clutch having a capacity based at least in part on the engine output torque range, and wherein the step of allowing relative rotational slip further comprises allowing relative rotational slip via the clutch.

18. The method of claim 17 wherein the step of generating resonance vibrations includes generating resonance vibrations at a generator speed within a lower half of the generator speed range.

19. The method of claim 18 wherein the step of generating resonance vibrations further includes generating resonance vibrations at a generator speed corresponding to an engine speed that is less than an engine idle speed.

* * * * *